United States Patent [19]

Yaghmaie et al.

[11] Patent Number: 4,705,537

[45] Date of Patent: * Nov. 10, 1987

[54] PROCESS FOR SEPARATING CLARIFIED WATER FROM AN AQUEOUS DISPERSION OF ASH, SLAG AND CHAR PARTICULATE MATTER

[75] Inventors: Farrokh Yaghmaie; Mitri S. Najjar, both of Hopewell Junction; Louis S. Sorell, Carmel, all of N.Y.

[73] Assignee: Texaco Inc., White Plains, N.Y.

[ * ] Notice: The portion of the term of this patent subsequent to Jun. 25, 2002 has been disclaimed.

[21] Appl. No.: 803,689

[22] Filed: Dec. 2, 1985

[51] Int. Cl.$^4$ ............................................. C02F 1/54
[52] U.S. Cl. ...................... 48/197 R; 48/206; 48/210; 210/712; 210/718; 210/725; 210/727; 210/730
[58] Field of Search ............... 210/714, 718, 724, 725, 210/727, 728, 730, 919, 712; 55/89, 228; 48/197 R, 206, 210; 252/373

[56] References Cited

U.S. PATENT DOCUMENTS

| | | | |
|---|---|---|---|
| 2,200,784 | 5/1940 | Wallace | 210/730 |
| 3,306,714 | 2/1967 | Goren | 210/730 |
| 3,544,291 | 12/1970 | Schlinger et al. | 48/200 |
| 3,607,157 | 9/1971 | Schlinger et al. | 48/197 R |
| 4,502,868 | 5/1985 | Yaghmaie et al. | 252/353 |
| 4,525,280 | 6/1985 | Vasconcellos et al. | 210/728 |

OTHER PUBLICATIONS

Hackh's Chemical Dictionary 4th edition, McGraw-Hill, 1969, p. 646.

*Primary Examiner*—Peter Hruskoci
*Assistant Examiner*—Jeffrey W. Peterson
*Attorney, Agent, or Firm*—Robert A. Kulason; James J. O'Loughlin; Albert Brent

[57] ABSTRACT

Separation of clarified water and rapid settling of the particulate solids e.g. ash, slag, char and mixtures thereof from aqueous dispersions of quench cooling and/or scrubbing water as produced in the partial oxidation process for ash-containing solid carbonaceous fuels is effected by mixing with said dispersion a sulfonated product of humic acids and their salts and adjusting the pH of the mixture to a value in the range of about 2 to 6.

11 Claims, No Drawings

PROCESS FOR SEPARATING CLARIFIED WATER FROM AN AQUEOUS DISPERSION OF ASH, SLAG AND CHAR PARTICULATE MATTER

BACKGROUND OF THE INVENTION

This invention relates to a process for separating out clarified water from a water dispersion of particulate solids from the group comprising ash, slag, char, and mixtures thereof as produced by cooling and/or scrubbing with water the hot gas stream from the partial oxidation of ash-containing solid carbonaceous fuels.

Ash containing solid carbonaceous fuels e.g. coal, lignite, oil shale, tar sands have been used as fuel in the partial oxidation process for the production of synthesis gas, reducing gas, and fuel gas. Reference is made for example to coassigned U.S. Pats. Nos. 3,544,291; 3,607,157; 3,976,442; and 3,996,026.

The hot raw gas stream leaving the reaction zone of the gas generator for the partial oxidation of ash-containing solid carbonaceous fuel contains entrained solid particulate matter e.g. slag, ash and char. The temperature of the raw effluent gas stream is in the range of about 1700° to 3000° F. The raw gas stream may be cooled by direct quenching in water. Alternatively, the hot raw gas stream may be partially cooled by indirect heat exchange and then scrubbed with water. Substantially all of the entrained solids are removed from the gas stream during the quench cooling and/or scrubbing operation and a dilute water dispersion is formed. It is of economic importance to remove clarified water from the dispersions of spent quench and/or scrubbing water and recycle the clarified water in the process. Where the concentrated slurries of solid fines are rich in carbon, it is desirable to recycle them to the gas generator as a portion of the feed.

One major problem in recovering and recycling the solid fines from dilute water dispersions is their resistance to settling. This resistance is caused by their natural hydrophobicity and fine particle size. The hydrophobic nature of these solids prevents them from becoming completely wetted. Further, there is a tendency for them to seek out air/water interfaces, either at the surface or in the pockets caused by agitation. The result is a suspension or cloudy water phase from which it is difficult to separate and collect the solid particulate. Recovery becomes expensive. Even for example with vacuum filtration, a substantial amount of the fines e.g. 10-25% remains in suspension. It was unexpectedly found that by the subject process, the particulate matter comprising ash, slag, char, and mixtures thereof in the dilute dispersions of quench and scrubbing water can be made to rapidly separate from the water. Separation times are faster than those in coassigned U.S. Pat. No. 4,525,280 in which more costly surfactants coupled with metal salts are employed. The clarified water may be then recycled to the quench cooling and/or scrubbing zone; and any solid particulates which are rich in carbon may be recycled to the gas generator as a portion of the fuel. The efficiency of the partial process is thereby increased.

SUMMARY OF THE INVENTION

This is a process for separating clarified water from a dilute water dispersion of ash, slag and char particulate matter formed by quench cooling and/or scrubbing with water the hot raw effluent gas stream from the reaction zone of a gas generator for the partial oxidation of a solid carbonaceous fuel with a free-oxygen containing gas in the presence of a temperature moderator. The dilute water dispersion of particulate solids from the group comprising ash, slag, char, and mixtures thereof having a solids content in the range of about 0.1 to 50.0 wt. % at a temperature in the range of about 60° to 700° F., and a pressure in the range of about 1-250 atmospheres, is mixed with a surfactant comprising a sulfonated product of humic acids and their salts. For example, said anionic surfactant may comprise an anionic humosulfonate salt of the group consisting of $NH_4$, Na, Ca, and mixtures thereof. The anionic surfactant and sufficient acid to adjust the pH of the mixture to a value in the range of about 2 to 6 are mixed together, for example, with the dilute water dispersion in the gas quench tank of a partial oxidation gas generator, or in or prior to a gravity settler, or by means of a static mixer. Rapid separation of clarified water from a concentrated aqueous dispersion of the solid particulate matter then takes place. A conventional solids-liquid separator such as one selected from the group consisting of at least one liquid cyclone, centrifuge, settler, clarifier, screen, filter, and combinations thereof may be used to separate the clarified water from the concentrated aqueous dispersion of solid particulate matter. Preferably, the clarified water stream may be obtained with a gravity settler by decanting. The efficiency of the partial oxidation process is improved by the subject invention since a stream of clarified water is rapidly produced and may be recycled to the quench cooling and/or scrubbing zone. Further, any aqueous slurry stream of carbon containing solid particulate matter that may be recovered may be recycled and mixed with fresh solid carbonaceous fuel to produce a slurry feed mixture for the partial oxidation gas generator.

DESCRIPTION OF THE INVENTION

Synthesis gas, reducing gas and fuel gas comprising mixtures of $H_2$, CO and various amounts of other gases may be made by the partial oxidation process, such as described in coassigned U.S. Pat. Nos. 3,544,291, 3,607,157, 3,998,609 and 4,289,502, which are incorporated herein by reference. Advantageously, the partial oxidation process may use as feedstock comparatively low-cost readily available ash-containing solid carbonaceous fuels. For example, the following ash-containing solid carbonaceous fuels are suitable feedstocks and include by definition: coal i.e. anthracite, bituminous, subbituminous, or lignite; particulate carbon; coke from coal; petroleum coke; oil shale; tar sands; asphalt; pitch; and mixtures thereof. In the partial oxidation process, ground solid fuel is introduced into the gas generator either alone or in the presence of a substantially thermally vaporizable hydrocarbon and/or water, or entrained in a temperature moderator such as steam, $CO_2$, $N_2$ and recycle synthesis gas. The term free-oxygen containing gas, as used herein is intended to include air, oxygen-enriched air, i.e. greater than 21 mole % oxygen, and substantially pure oxygen i.e. greater than 95 mole % oxygen (the remainder comprising $N_2$ and rare gases).

Entrained in the hot raw gas stream leaving the reaction zone of the gas generator at a temperature in the range of about 1700° to 3000° F. is particulate matter from the group comprising ash, slag, char, and mixtures thereof. The concentration of solids in the hot raw gas stream may be in the range of about 0.1 to 4 grams per standard cubic foot (SCF). The composition will depend upon the type of solid carbonaceous fuel and the temperature and operating conditions of the partial oxidation gas generator. By definition: Ash in the raw gas stream is the remnants of completely combusted particles of the solid carbonaceous fuel. The ash particles in the hot gas stream have not reached the melting temperature of the mineral matter originally contained in the solid fuel. About 58 to 80 wt. %, such as about 70 wt. % of the ash particles are less than about 325 microns and typically less than 67 microns in size. Typical compositions of the ash particles in the gas stream from a coal feed for example in wt. % follow: $SiO_2$ 58.8–62.6; $Al_2O_3$ 15.8–20.0; $Fe_2O_3$ 3.3–5.1; $TiO_2$ 0.8–1.4; $CaO$ 5.3–7.6; $MgO$ 0.5–1.6; $Na_2O$ 0.2–0.4; $K_2O$ 0.4–0.7; $P_2O_3$ 0.1–0.3; and $SO_3$ 0.9–3.2. Slag is substantially molten ash or molten ash which has solidifed into glassy particles. Slag particles are remnants of completely burnt coal particles or slurry droplets and represent the fused mineral matter of the solid carbonaceous fuel feed. The content of mineral matter e.g. ash in a typical solid carbonaceous fuel in weight percent may be about 0.2 for petroleum coke and 20.0 for coal. The size of coarse solid particles of slag is in the range of about 2000 to about 37 microns; and the size of fine solid particles of slag is a fraction thereof. Char is the devolatilized and partially combusted solid carbonaceous fuel particles consisting mainly of ash. The remainder of the char e.g. about 2–65 wt. % comprises carbon, and a little, if any, of hydrogen and sulfur. Char particles are porous and the size is typically below 841 microns. The particles have not reached the melting temperature of the mineral matter originally contained in the solid carbonaceous fuel. The particulate matter in the effluent gas stream may comprise about 80 to 100 wt. %, such as about 90 to 99 wt. % of ash and slag and the remainder may comprise char. The amount of char in the effluent gas stream may be decreased by increasing the temperature of the reaction zone.

The hot raw effluent gas stream exits from the partial oxidation gas generator and may be cooled to a temperature in the range of about 60° to 950° F., such as less than about 350° F. For example, the hot gas stream may be first partially cooled by direct contact with water contained in a quench tank, such as shown in coassigned U.S. Pat. No. 4,218,423 which is incorporated herein by reference. Molten slag is solidified by the quench water and most of the ash, slag and char are transferred to the water in the quench tank. The partially cooled gas stream may be then passed through a water scrubbing operation to remove any remaining entrained particulate matter. The pressure in the quench tank is substantially the same as the gas generator located above, and a portion of the quench water at the bottom of the quench tank is removed by way of a lockhopper system and settler, such as shown in coassigned U.S. Pat. No. 3,607,157. Another stream of quench water carrying fine particles exits the gasifier quench chamber in response to a liquid level controller and is directed to a settler. Alternatively, the hot raw effluent gas stream from the reaction zone may be partially cooled, by indirect heat exchange, prior to being scrubbed with water, by being passed through a radiant or convection gas cooler. Ash and coarse and fine particles of slag and char may pass from the water sump of the gas cooler and are collected in a lock hopper vessel. The solids and water from the lock hopper may then flow by gravity into a water sump or settler where optionally the coarse particulate solids may be removed by screens thereby producing a dispersion of fine particulate solids. For example, a portion of the quench water at the bottom of quench tank 26 is removed by way of a lockhopper 37 and settler 40 as shown in the drawing for coassigned U.S. Pat. No. 3,544,291 which is incorporated herein by reference. The aqueous suspensions of particulate matter from the group consisting of slag, fly-ash, char, and mixtures thereof in lines 39, 41 and 42 of U.S. Pat. No. 3,544,291 have solids concentrations in the range of about 1.0 to 50.0 wt %, such as about 10 to 20 wt. %. For example, the overflow stream in line 41 of the drawing in coassigned U.S. Pat. No. 3,544,291 may have a solids content of particulate matter in the range of about 1.0–4.0 wt. % and a particle size in the range of about 37 to 2000 microns. The underflow in line 42 may have a solids content of particulate matter in the range of about 5 to 50 wt. % and a particle size of up to about 200 microns or more.

The aforesaid quench cooling water, scrubbing water, or both comprising water dispersions having a solids content in the range of about 0.1 to 50.0 wt. %, such as about 0.5 to 5 wt. %, say about 1 to 3 wt. % of particulate solids from the group ash, slag, char, and mixtures thereof are combined or separately treated in the subject process. The water dispersion at a temperature in the range of about 60° to 700° F., and a pressure in the range of about 1 to 250 atmospheres is mixed with a water soluble anionic sulfonated product of humic acids and their salts. For example said anionic surfacant may comprise an anionic humosulfonate salt of the group consisting of $NH_4$, Na, Ca, and mixtures thereof. The surfactant is introduced in the amount of about 0.1 to 5.0 wt. %, such as about 0.5 to 2.0 wt. % (basis wt. of particulate solids in aqueous dispersion). Substantially all of the particulate solids settle by gravity in the water dispersion. A clarified water stream substantially free from particulate solids e.g. less than 200 parts per million may be removed for example, from the upper portion of a gravity settler, and a concentrated aqueous dispersion having a solids content in the range of about 1 to 65 wt. %, such as about 10 to 30 wt. % may be removed at or near the bottom of the settler.

The sulfonated product of humic acids and their salts found suitable for use in the subject process are prepared from a solid carbonaceous fuel bearing humic acids and selected from the group of solid carbonaceous fuels consisting of peat, lignite, sub-bituminous, bituminous and anthracite coals. The analysis of humic acid from a typical solid carbonaceous fuel is as follows in wt. %: C 20 to 30, H 0.1 to 10, N 0.1 to 5, ash 20 to 40, and moisture 20 to 40. The solid carbonaceous fuel is finely ground to at least 60 mesh size so that 100% passes through a sieve designated ASTM E11 Sieve Designation Standard 250 microns Alternative 60. The humic acids in said solid carbonaceous fuel are neutralized with any suitable base. For example, $NH_4OH$, $NaHCO_3$, $Ca(OH)_2$, $NaHSO_3$ may be used. Preferably, $NH_4OH$ is used where the corrosive effects of alkali metals are to be minimized. The mixture of solid carbonaceous fuel and base are held at a temperature of about 50° C. for about an hour to speed the neutralization reaction. The mixture is then contacted with sulfur dioxide under sulfonation reaction conditions, preferably at ambient temperature and above about 25 psig pressure, such as from about 25 to 35 psig. Sulfonation is complete when sulfur dioxide is no longer absorbed by the reaction mixture. The reaction mixture is washed with water to extract the water soluble humosulfonates. Unreacted solid particulate matter is removed, preferably by filtration, and the filtrate is evaporated to dryness by gentle heating, e.g., on a steam bath. Advantageously, the raw materials e.g. humic acids from peat are low priced, and the process of converting them into the desired surfactant is a low cost process. Reference is made to coassigned U.S. Pat. No. 4,502,868, which is incorporated herein by reference, for further information on humosulfonates.

The subject invention is believed to function by increasing the wettability of the solid particulates by reducing their hydrophobicity. Owing to their naturally high density, once wetted, the solid particulates may settle rapidly, according to Stoke's law. Over 99 wt. % of the fines precipitate out, giving a two phase mixture that can be easily separated.

The dispersions of particulate solids from the group ash, slag, char, and mixtures thereof in quench and/or scrubbing water are mixed with the anionic surfactant comprising a sulfonated product of humic acids and their salts and an acid. For example, a mineral acid selected from the group consisting of $H_2SO_4$, HCl and $HNO_3$ may be used to adjust the pH of the mixture to a value in the range of about 2 to 6, such as about 3 to 5. The mixing may take place in any of the following ways: (1) In or prior to a gravity settling tank or clarifier, at a temperature in the range of about 60° to 250° F., such as about 150° to 200° F. For example, mixing may take place in or prior to sedimentation vessel 35 as shown in the drawing of coassigned U.S. Pat. No. 3,607,157. (2) In the quench water tank located below the reaction zone of the partial oxidation gas generator, at a temperature in the range of about 60° to 700° F., such as about 250° to 450° F., or (3) By means of a static mixer located in a pipeline leading to a settler or other conventional solids-liquid separator, at a temperature in the range of about 60° to 250° F., such as about 150° to 200° F. The in-line static mixer comprises a free-flow cylindrical conduit which encloses a plurality of fixed helical-shaped curved sheet-like elements that extend longitudinally in series. Flow division and radial mixing occur simultaneously within the conduit. There are no moving parts nor external power requirements.

Separation of clarified water from the concentrated aqueous dispersion of particulate solids may be effected by decanting the clarified water stream from the upper section of the settler or clarifier, and removing the concentrated aqueous slurry e.g. about 1 to 65 wt. % from the lower end of the settler. Atmospheric gravity or pressure settlers may be used. Optionally, the water dispersion may from the lower end of the settler. Atmospheric gravity or pressure settlers may be used. Optionally, the water dispersion may be passed through screens to remove any larger slag particles prior to the settler. At least a portion e.g. 10 to 90 volume % of the overflow stream of clarified water from the settler may be recycled to the quench cooling and/or scrubbing zone. The remainder of the clarified water may be introduced into a water treatment facility prior to discharge from the system. Depending on its carbon content and with or without dewatering to remove at least a portion of the water, the slurry of particulate solids recovered from the bottom of the settler may be mixed with fresh ash-containing carbonaceous fuel and recycled as at least a portion of the feed to the partial oxidation gas generator. Alternatively, the particulate solids may be separated from the water and used as landfill or burned as fuel in auxiliary equipment.

In another embodiment, clarified water may be separated from the precipitated particulate solids by means of conventional solids-liquid separators such as one or more liquid cyclones, also known as hydroclones, that may be connected in series and/or parallel, centrifuge, settler, clarifier, screen, filter, and combinations thereof.

EXAMPLES

The following example illustrates a preferred embodiment of the process of this invention. The Example should not be construed as limiting the scope of the invention.

EXAMPLE I

Hot raw synthesis gas produced by the partial oxidation of Illinois No. 6 coal was quench cooled with water to produce an aqueous dispersion of particulate matter e.g. a mixture of ash, slag and soot having a solids content of about 2.0 wt. %. The size of the particles was less than 45 microns. In Run No. 1, 25 ml of the aqueous dispersion were mixed with about 1.0 wt. % (basis weight of particulate matter in aqueous dispersion) of ammonium humosulfonate in a column. The pH of the mixture was adjusted to 3–5 by the addition of $H_2SO_4$. In less than 1 minute, 99.5 wt. % of the particulate matter separated and formed a concentrated slurry having a solids content of about 13 wt. % in the first 3.3 ml from the bottom of the column. Further, a clear supernatant water layer formed above the concentrated dispersion layer. The terminal volume of the settled particulate matter was small. Very little settling took place thereafter. After 11.5 minutes, for example, 99.5 wt. % of the particulate matter formed a concentrated slurry having a solids content of about 16.5 wt. % in the first 2.5 ml from the bottom of the column.

For comparative purposes, Run No. 2 was made in the same way as Run No. 1 but without the addition of the ammonium humosulfonate surfactant. After 5.67 minutes, 98 wt. % of the particulate matter formed a concentrated slurry having a solids content of about 3.8 wt. % in the first 12.5 ml from the bottom of the column. The supernatant water was not clear and contained suspended particles. After 11.6 minutes, 98 wt. % of the particulate matter formed a concentrated slurry having a solids content of about 5 wt. % in the first 9.5 ml from the bottom of the settling column. Thus, the terminal volume of the suspended matter was larger than that in Run No. 1.

From the above results, it may be concluded that by the introduction of humic acids and their salts into the dilute aqueous dispersion of particulate matter comprising ash, slag and soot, and adjusting the pH to a value in the range of about 2–6, the settling rate of the particulate matter is higher, the supernatant water becomes clear, and the terminal volume of particulate matter is reduced.

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

We claim:

1. In a process for reacting a feedstock comprising an ash-containing solid carbonaceous fuel selected from the group consisting of anthracite coal, bituminous coal, sub-bituminous coal, lignite, particulate carbon, coke from coal, petroleum coke, oil shale, tar sands, asphalt, pitch, and mixtures thereof with a free-oxygen containing gas in a free-flow partial oxidation gas generator to produce a hot raw effluent gas stream comprising $H_2$, CO, other gaseous material, and entrained particulate solids selected from the group consisting of ash, slag, char and mixtures thereof, and having a particle size in the range of about 2000 to about 37 microns; the improvement comprising:

(1) cooling and scrubbing said hot raw effluent gas stream from the gas generator with water in a gas cooling and scrubbing zone, thereby removing said entrained particulate solids from the effluent gas stream and producing a water dispersion of particulate solids;

(2) mixing with said water dispersion of particulate solids an anionic surfactant comprising a sulfonated product of humic acids and their salts, and sufficient acid to provide said mixture with a pH in the range of about 2 to 6; wherein said surfactant is added in the amount of about 0.01 to 5.0 wt. % basis weight of said particulate solids in said water dispersion, and is sufficient to decrease the hydrophobicity of the particles whereby the wettability of said particulate solids is increased to aid in the settling; and settling said particulate solids; and wherein said anionic surfactant is prepared by grinding organic material bearing humic acids and selected from the group consisting of peat, lignite, sub-bituminous, bituminous and anthracite coals to at least 60 mesh size, neutralizing said humic acids with a base to form a reaction mixture, and contacting said reaction mixture with sulfur dioxide under sulfonation conditions until a substantial part of the humic acids contents of said reaction mixture is sulfonated to form said surfactant;

(3) separating a clarified stream of water substantially free from said particulate solids in a solids-liquid separating zone, and concentrated aqueous dispersion of said particulate solids; and (4) recycling at least a portion of said clarified water to said gas cooling and scrubbing zone.

2. The process of claim 1 wherein the mixing in (2) takes place in or prior to a gravity settling zone wherein the solids settle by gravity, and the clarified stream of water is separated in (3) by decanting.

3. The process of claim 1 wherein the mixing in (2) takes place in the quench water tank of the partial oxidation gas generator.

4. The process of claim 1 wherein the mixing in (2) takes place in a static mixing zone.

5. The process of claim 1 wherein said surfactant comprises an anionic humosulfonate salt of the group consisting of $NH_4$, Na, Ca, and mixtures thereof.

6. The process of claim 1 wherein said concentrated aqueous dispersion of particulate solids from (3) has a solids content in the range of about 1 to 65 weight percent.

7. The process of claim 1 provided with the step of introducing said concentrated aqueous dispersion of particulate solids from (3) with or without dewatering into said partial oxidation gas generator as at least a portion of said feedstock.

8. The process of claim 1 wherein the solids-liquid separating zone in (3) is selected from the group consisting of at least one liquid cyclone, centrifuge, settler clarifier, screens, filter, and combinations thereof.

9. The process of claim 1 wherein said free-oxygen containing gas is selected from the group consisting of air, oxygen-enriched air which is greater than 21 mole % oxygen, and substantially pure oxygen which is greater than 95 mole % oxygen.

10. The process of claim 1 wherein the gas cooling and scrubbing zone in (1) includes a quench tank and gas scrubbing means.

11. The process of claim 1 wherein the gas cooling and scrubbing zone in (1) includes radiant and/or convection gas cooling means and gas scrubbing means.

* * * * *